June 7, 1960 F. OSTWALD 2,939,428
DEVICE FOR INCREASING TORSIONAL FORCE
Filed May 17, 1957 3 Sheets-Sheet 2

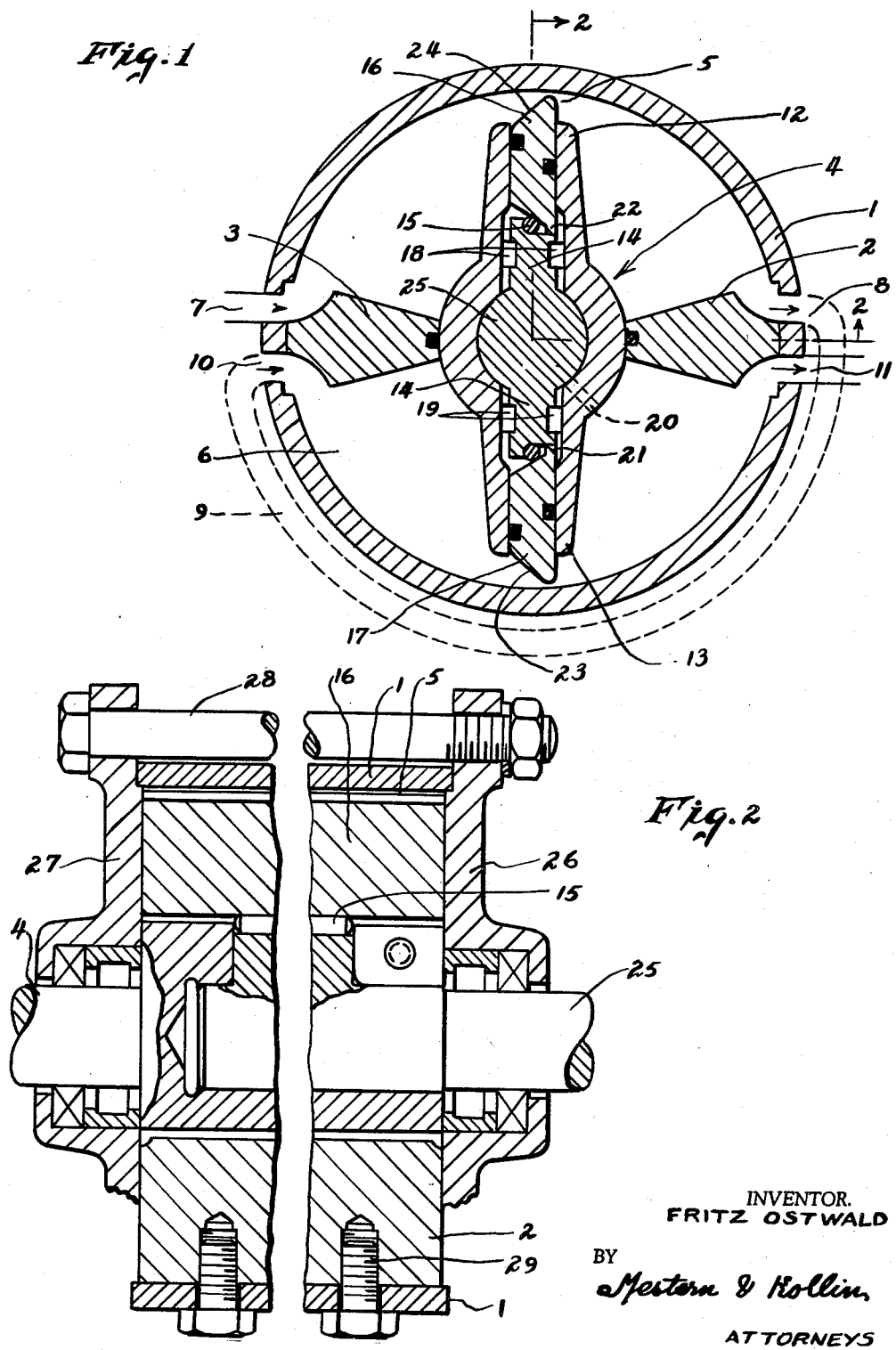

INVENTOR.
FRITZ OSTWALD
BY
*Mestern & Kollin,*
ATTORNEYS

June 7, 1960  F. OSTWALD  2,939,428
DEVICE FOR INCREASING TORSIONAL FORCE
Filed May 17, 1957  3 Sheets-Sheet 3

INVENTOR.
FRITZ OSTWALD
BY

United States Patent Office 2,939,428
Patented June 7, 1960

2,939,428

DEVICE FOR INCREASING TORSIONAL FORCE

Fritz Ostwald, Heppenheim an der Bergstrasse, Germany, assignor to Alfred Teves Maschinen- und Armaturenfabrik K.G., Frankfurt am Main, Germany Filed May 17, 1957, Ser. No. 659,890

Claims priority, application Germany May 18, 1956

2 Claims. (Cl. 121—41)

This invention relates to means for increasing the torsional force, especially in motor vehicle drives. According to the invention a device for increasing torsional force is proposed, which consists of a cylindrical housing divided into two chambers traversed in the same direction by the pressure medium, said housing being provided with a cam-shaped steering member is connected with the actuating shaft, preferably the hand lever shaft, said cam being employed to control the valves or slide valves influencing the liquid stream, said valves being located in the guide pieces of the driven shaft preferably the steering rod lever, pivotally arranged in the separating wall.

According to the invention the construction form may be executed in details in such a manner that the cam-shaped steering member of the actuating shaft, is arranged rotatably in the driven shaft and acts upon the slide valve with the aid of balls and rollers mounted on slanted surfaces, whereby the mounting slopes are formed in such a manner, that depending on the direction of rotation only one slide valve at a time is adapted to slide outwardly in a radial direction and the other one is prevented from moving inwardly by a stop. The ends of the slide valves facing the housing are preferably curved or slanted in order to attain a proportionality between the manual steering force and the auxiliary power.

A possible other construction form consists in shaping the guide pieces of the driven shaft as wings abutting tightly against the housing and acting as a seal, each of said wings being provided with a filter opening. The filter openings are controlled by valves which are, in turn, actuated by a cam-shaped steering member rotatably arranged in the driven shaft. The arrangement of the valves is such that only one valve is actuated in each direction of rotation and the other is prevented from reacting on the steering member by a stop.

Having thus generally described the invention, it should be understood that the embodiments illustrated in the accompanying drawings are given by way of exemplification and not of limitation and that various changes in the construction, shape, and combination may be made therein without departing from the spirit of the invention.

In the drawings,

Fig. 1 shows a cross-section of the above described embodiment of the invention.

Fig. 2 is a section view on line 2—2 of Fig. 1 also showing additional part not seen in Fig. 1.

Figure 3:
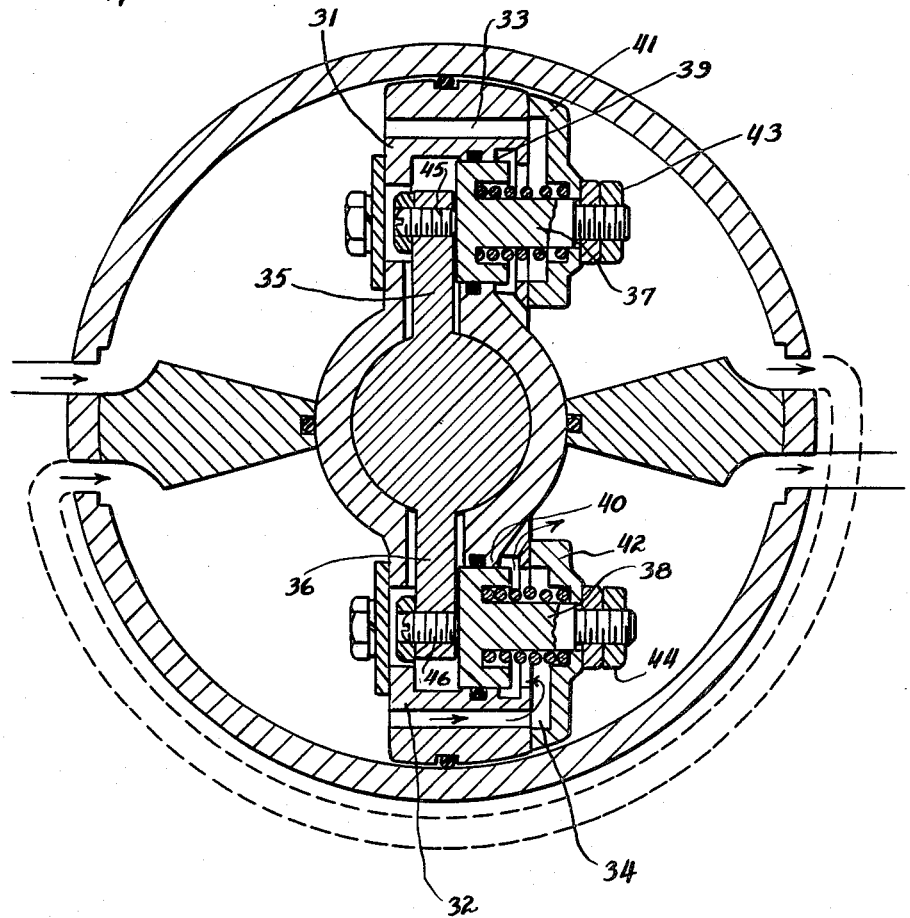
Fig. 3 is a cross-section of another embodiment of the invention.

Figs. 1 and 2 are illustrations of the device for increasing torsional force in which a cam-shaped steering shaft 25 with cams 14 is rotatably arranged in the driven shaft 4 and acts upon the slide valves 16, 17 over rollers 15 biasing on slanted end faces of the slide valves 16 and 17. The cylindrical housing 1 is provided with two bearing parts 2 and 3 in which the driven shaft 4 is arranged concentrically to the housing 1 and acting as a seal. The bearing parts 2 and 3, firmly connected with the housing, divide at the same time the inside of the housing into the two chambers 5 and 6. The pressure means coming from the pump enters the housing chamber 5 at 7 and leaves it through the outlet bore 8. The outlet bore 8 is connected through a duct 9 with an inlet bore 10 of the second chamber 6 the outlet opening of which is designated by the reference numeral 11. This arrangement of the inlet and outlet openings effects a unidirectional flow through both chambers.

The concentrically arranged driven shaft 4 is provided with guide pieces 12 and 13 oppositely disposed from one another. In these the cams 14 connected with the actuating shaft 25 and rotatably mounted in the driven shaft 4 are led in a sealing manner over the slide valves 16 and 17 actuated on rollers 15. Between the cams 14 and the guided pieces 12 and 13 there are arranged flat-formed return springs 18 and 19.

Reference numeral 20 designates an equalization bore. Oil which leaks through the space between slide valves 16 and 17 flows back into the pressureless chamber 6 through bore 20. The pressure created by this oil in the space between shaft 25 and shaft 4 is thus equalized. The mounting slopes of slide valve 16 or 17 and the cam 14 are formed in such a manner that depending on the direction or rotation only one slide valve 16 or 17 slides in a radial direction. The slide valves 16 or 17 are provided with projections 21 and 22 for the purpose of preventing the slide valve which is not set against the housing from acting upon the cam against the rotational direction. Furthermore, the slide valves are formed with slanted surfaces 23 and 24 at the sides facing the housing wall, where by a proportionality between the manual steering force and the auxiliary power is attained.

The cylindrical housing is closed on each of its sides by lids 26 and 27 mounted on the actuating shaft or the driven shaft, said lids being pressed onto the housing 1 by means of a tension anchor bolt 28.

The connection between the bearing parts 2 or 3 and the housing 1 is effected by means of screws 29.

In the central position of the hand wheel the pressure medium coming from the pump enters into the device for increasing the torsional force and flows freely through its two chambers. When a torsional moment acts on the hand wheel, in clockwise direction, for instance, the cam is turned relatively to the driven shaft, in such a manner that one of the roll runs on the slopes of the corresponding slide valve and pushes the latter towards the inner wall of the housing, up to its base, whereby throttling of the flow of the pressure medium with consequent blocking is achieved. The throttling of the flow effects a build-up of pressure in the chamber before the throttling point, which acts upon the driven shaft over its corresponding guide piece in a manner which produces a torsional force. Thus the torsional force produced by hand and transferred to the driven shaft is reinforced. As the steering wheel is turned clockwise, the pressure fluid driven out of chamber 5 is led freely over the second chamber into the fluid container of the hydraulic system. A retroactive effect of the passing pressure fluid on the slide valve 17 of chamber 6 is avoided, as the slide valve presses against the cam with its projection and therefore cannot produce a torsional moment in the opposite direction of the rotation. The slanted surfaces of the slide valve ends, facing the housing wall, provide the desired proportionality between the regulating power at the hand wheel and the working pressure.

In the embodiment according to Fig. 3 the guide pieces of the driven shaft are formed as wings 31 and 32, lying adjacent to the housing wall and acting as a seal. Each wing is provided with a filter opening 33 and 34 respectively, the cross-section aperture area of which is controlled by valves 37 and 38 which are actuated in turn by the cam arms 35 and 36. Here, too, as in the previously described embodiment, the cam is mounted rotatably in the driven shaft, just as the latter is mounted in a sealing manner in the bearing parts connected with the housing. The valves 37 and 38 are slidably mounted in tangentially running bores 39 and 40 and are supported on springs by cover plates 41 and 42 connected with the wings. Corresponding to the bases of the slide valve in the present construction form, the valve body 38 is provided with a threaded portion onto which are screwed stop members 43 and 44. These stop members limit the inward movement of the valves to a predetermined length. In the ends of the cam arms 35 and 36, bolts 45 and 46 are arranged, which transmit the torsional power of the cam to the valve body. The adjustability of the bolts makes it possible to vary the rotation within small limits. The mode of operation of this embodiment is the same as that of the embodiment according to Fig. 1.

Figure 4:
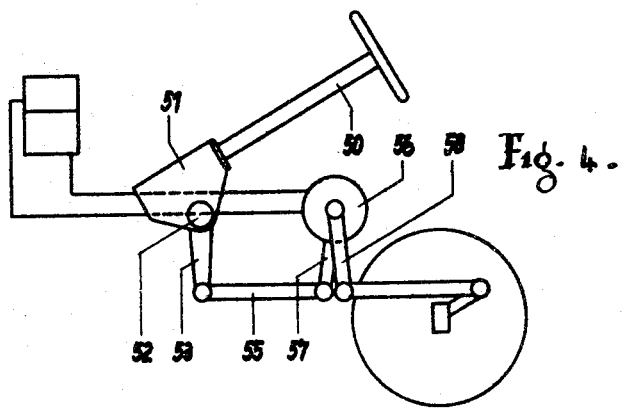
Figs. 4–6 illustrate various ways of arranging the means for increasing the torsional force in a motor vehicle drive.
Figure 5:
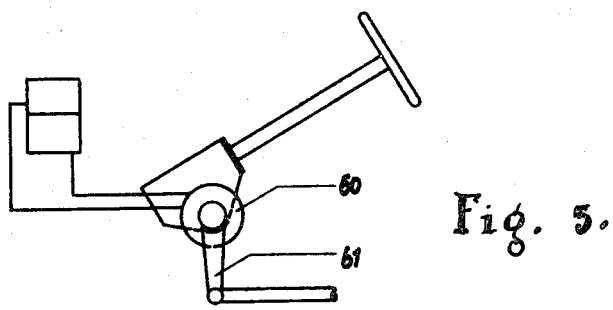
Figure 6:
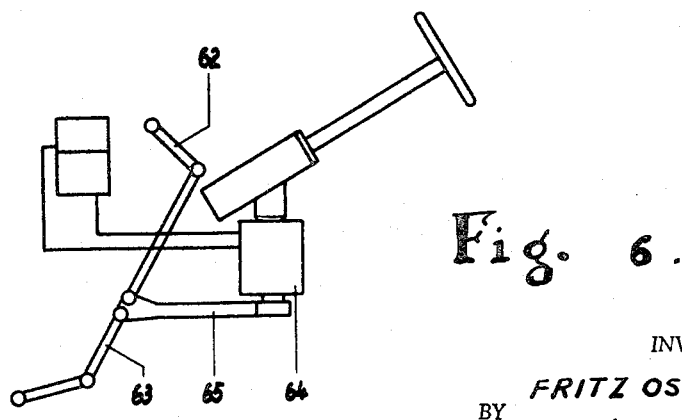

In Figs. 4 to 6 various possibilities of arranging the device for increasing torsional force are shown. In Fig. 4 the guide column is designated as 50 and the control gear as 51, said control gear being connected through steering knuckle shaft 52 with the steering gear arm 53 on which, in turn, is pivoted the torque rod 55. In this construction form, the torque rod 55 is divided for the interpolation of the device 56 or device 60 for increasing torsional force. The connection between the two torque rod parts and the device for increasing torsional force is effected by means of the two levers 57 and 58, representing the driver and driven part respectively.

In the construction according to Fig. 5 the device 60 for increasing torsional force is mounted between the steering knuckle shaft and steering gear arm 61. The steering knuckle shaft serves as driver and the steering gear arm as the driven member of the mechanical and hydraulic power steering. The construction according to Fig. 6 differs from the construction according to Fig. 5 only in that it does not employ a torque rod consisting of one part and connected at its end with the steering gear arm by a link, but a torque rod divided once, both parts 62 and 63 of which pivot on the steering gear arm 65 serving as the driven member of the device 64 for increasing torsional force.

What I claim is:

1. A device for increasing the torsional steering force in a motor vehicle provided with means for supplying pressure medium; comprising, in combination, a cylindrical housing; a pair of opposed spaced bearing members integral with and extending inwardly of said housing; a driven shaft member rotatably received between said bearing members and in sealing engagement therewith, said driven member and said bearing members forming first and second chambers sealed off from one another, each of said chambers having inlet and outlet openings; means for communicating the outlet of said first chamber with the inlet of said second chamber, said driven member having a central annular hollow portion and a pair of opposed radially extending guide elements, first and second valve elements in said first and second chambers and slidably received in said guides respectively, a driving shaft cam member rotatably displaceable in said hollow portion of said driven member and in operative engagement with said first and second valve elements, said cam member being adapted to displace one of said valve elements for shutting off the flow of pressure medium through said first chamber, while maintaining said second valve element in open position to allow the passage of the pressure medium through said second chamber, whereby when torsional force is applied in the first chamber, pressure medium flows freely through said second chamber and no opposing force is applied in an opposite direction.

2. The device according to claim 1, wherein spring means are provided so as to permit the valve elements to remain open when no torsional force is applied to said driving member.

References Cited in the file of this patent

UNITED STATES PATENTS 1,876,104     Tucker _____ Sept. 6, 1932